UNITED STATES PATENT OFFICE.

WILLIAM S. BARNARD, OF CANTON, ILLINOIS; MARY N. BARNARD ADMINISTRATRIX OF SAID WILLIAM S. BARNARD, DECEASED.

EMULSION AND METHOD OF MAKING SAME.

SPECIFICATION forming part of Letters Patent No. 580,150, dated April 6, 1897.

Application filed May 31, 1882. Serial No. 62,872. (No specimens.)

*To all whom it may concern:*

Be it known that I, WILLIAM S. BARNARD, of Canton, in the county of Fulton and State of Illinois, have invented certain Improvements in Emulsions and Methods of Producing the Same, of which the following is a specification.

The main object of this invention is to produce an emulsion which will be permanent in its character and which may be readily diluted with water or compounded with other substances.

The invention relates to the treatment of milk or certain constituents or products of milk with oil, with or without the addition of water or other substances, and to the product resulting from this treatment of these substances, the products serving as dietetic substances, as medicines for external or internal application, as anthelminthics, or as insecticides, or for other purposes; and the invention consists in the primary compositions, the processes by which they are prepared, and in the resultant substances, as hereinafter more particularly specified.

The following are a few of the compositions and substances which I produce:

First, the thickened emulsive constituents or products of milk with cod-liver oil or other fish-oils, either with or without the addition of water or other ingredients, hereinafter specified, as a dietetic substance for invalids.

Second, the thickened emulsive constituents or products of milk with castor-oil, with or without the addition of water, as a laxative.

Third, the thickened emulsive constituents or products of milk with croton-oil, or similar vegetable medicinal oils, with or without water, as a liniment.

Fourth, the thickened emulsive constituents or products of milk with petroleum or allied mineral oils, with or without the addition of water or any poison to increase the destructive properties of this aforesaid new composition, or the resultant composition from its union with said poison. The petroleum preparations may be for medicine, vermifuge, or insecticides.

Fifth, any of the above new compositions or substances with the addition of any substance suitable to conceal any objectionable taste or odor or impart better flavor or odor to said compositions or substances or to preserve them.

Sixth, the thickened emulsive constituents or products of milk with cotton-seed oil or other edible vegetable or animal or mineral oil or fat or fatty matter, with or without sugar or salt or starchy matters to help enrich or preserve the same, or artificial odors or coloring or flavoring substances, or additional water, constituting a dietetic substance.

Seventh, any of the above-specified new compositions or substances together with any disinfectant or preservative for preventing fermentation or decomposition of said composition or substance, such as creosote, salt, or sugar.

In the preferred process of preparation the first step is to bring the milk to the right condition. This is preferably done by using a vacuum-pan, such as used in the manufacture of sugar. It should be so treated until it reaches a thickened consistency, preferably the consistency of syrup or molasses, in which condition it is found to contain all or substantially all the desirable emulsive parts or constituents which were originally present therein. The thickened milk and the oil, alone or in combination with the other ingredients of either of the compositions or substances above specified, are to be thoroughly agitated together to any extent desired. This may be done by any suitable means, but when operating on a small scale I prefer to make use of a device after the general plan of what is commonly known in the market as the "Dover egg-beater." For manufacturing on a larger scale large machines of similar construction will be used, with provision for operating them by power. The agitation mixes the ingredients intimately, so that in a few moments, usually two minutes or less, the particles of oil become exceedingly small and the whole mass appears homogeneous. The mixture is then made. The more intimately the substances are mixed the more durable will the substance or emulsion be. It is preferred to add the oil gradually during the agitation as fast as it disappears and as long as the mass continues to toughen. If it thus becomes so tough as to cut into lumps, it may be regarded as a saturated thickened emulsion, and this product can be further toughened by evaporation. The relative quantities of the oil and milk may be greatly varied and will in practice be modified according to the purposes for which the product is to be employed and the consistence which may be demanded. A supersaturation with oil or the addition of more oil than it will hold should be avoided, the amount of oil that it will hold being related to the density of the oil and the condition of the emulsive.

Preparations produced as above, whether of liquid, semisolid, or solid consistency, are practically permanent, but if to be kept a very long time are preferably kept from the air and from additional moisture. They may at any time be diluted to any attenuation desired as emulsions.

Instead of first thickening the milk by the process before described it may be diluted with water or other diluent before or during agitation, in which case a saturated emulsion of it with the oil should be used, i. e., as much milk as will not separate from the oil after the agitation and on standing quietly for a long time or as much as the buoyancy of the oil will hold suspended, and I make use of the expression "saturated" or "supersaturated" with regard to emulsions correspondingly in the technical sense they bear in relation to solutions. The milk can be thickened in any case by the exhibition of actinic light or heat, of electricity, alcohol, tannic compounds, acids, or other oxidizing agents, but in the process I prefer the treatment before described.

It is difficult to use the oxidizing agents in such proportion as afterward to neutralize their effects by alkalies in a manner which will not afterward cause the decomposition of the product. In case water or any other reagent is used in either composition specified it should be preferably at the beginning of the agitation. Still in the process I prefer to employ such agents sometimes, usually as a matter of haste and when the product is to be used soon or upon insects, and I may be less particular about its quality. In the course of my experiments I discovered that the exposure of ordinary milk to intense sunlight and heat thickened it and quickly and improved the emulsifying power of the material and the quality and durability of the product. This fact should be borne in mind by those preparing a hasty emulsion of petroleum as an insecticide to be employed diluted with water.

In preparing the composition of milk and petroleum to be diluted as an insecticide, to which end ease, simplicity, and haste are especially desirable, and the substance generally to be used soon, I originated the method of preparing an emulsion by shaking together either fresh milk and petroleum or curdled milk and petroleum and afterward diluting the product with water to any extent desired, both with and without additional stirring or agitation. I also discovered the importance of adding water, which may be cold or hot, at the beginning of the process of agitation, and that thereby an emulsion of durable character was produced almost instantly, avoiding the greater labor by which I had made emulsions before. I also found that the curd separated from its whey and treated with water and oil made a good emulsion. Other diluents may be similarly used instead of water. With ordinary milk taken in any proportion desired with the oil, but preferably in a volume about equal to that of the oil, and where the substance is to be used soon, I add with agitation a volume of cold or hot water a little greater than the bulk of oil, but with milk reduced in the vacuum-pan as first specified only a very trifling amount of water is advisable and answers sufficiently to hasten the process, and afterward the whole may be diluted to any extent desired for application.

The emulsive constituents of the milk being agitated with water in the presence of oil apparently imbibe or envelop these substances and a process of thickening quickly follows, during which the surfaces of the particles of oil are covered and kept apart from each other. The soaking of leather with water for the purpose of making it take oil is a well-known fact, and a similar principle seems to apply in treating milk constituents, as it hastens the process remarkably. It would seem that oils can be taken into these emulsives more readily after water has prepared the way by opening the interstices in their substances, and the more these are opened the more easily can the oils penetrate. Following this treatment, which I call the "supersaturation process," if the emulsion is allowed to stand the superfluous liquid, constituting a supersaturation, is expressed from the emulsion by a contraction of the emulsive constituents and a buoyancy, due apparently to the oil, causing a thickened emulsion to rise above and separate sharply from the matter which is excreted downward. These may be floated off and separated as a durable mixture to be easily diluted to an emulsion of any attenuation desired in the future. For earlier use the oily particles need not be reduced so small as for future use, but in either case it is preferable that the oil particles shall be invisibly small and the mass appear homogeneous. This condition is easily effected by a little more agitation before or after the separation. In such a form, separated from superfluous water and sealed from the air, it keeps well and is practically permanent. All these emulsions are readily soluble in water. Insecticide preparations, including petroleum, should be extremely diluted, and they kill certain plants as readily as they kill insects. The proportion which each plant or insect can endure can only be ascertained by experiment on each. On the other hand, evaporation thickens these preparations. When containing non-volatile oils, toughening by evaporation may be practiced, but with volatile oils such toughening should be done in the milk before oil is mixed with it, and this is also preferable with any oil. Milk thus prepared makes an emulsion finer and quicker and helps avoid fermentation or decomposition in the products; but, where the use of the substance will allow it, it is also well to add a small quantity of creosote or other disinfectant in the mixture.

By "emulsive constituents, products, or parts of milk" is meant any or all parts of or derivable from milk which are mixable with oil to form emulsions.

Having thus described my invention, what I claim is—

1. The process of preparing stable insecticide emulsions which consists in combining by agitation kerosene-oil and milk or the emulsive constituents of milk as set forth.

2. The process of preparing stable emulsions which consists in combining by agitation kerosene-oil and milk in the presence of water.

3. The hereinbefore-described emulsion composed of milk and kerosene-oil.

4. The hereinbefore-described emulsion composed of kerosene-oil and the emulsive constituents of milk as set forth.

WILLIAM S. BARNARD.

Witnesses:
PHILIP T. DODGE,
WM. NICHOLS.